United States Patent [19]

Hill

[11] 4,255,227
[45] Mar. 10, 1981

[54] APPARATUS FOR FORMING LAMINATED FABRICS

[75] Inventor: Philip R. Hill, Nuremberg, Pa.

[73] Assignee: Chromatex, Inc., West Hazelton, Pa.

[21] Appl. No.: 114,604

[22] Filed: Jan. 23, 1980

Related U.S. Application Data

[63] Continuation-in-part of Ser. No. 971,804, Dec. 21, 1978, Pat. No. 4,188,445, which is a continuation of Ser. No. 859,851, Dec. 12, 1977, abandoned.

[51] Int. Cl.³ .............................................. B32B 31/04
[52] U.S. Cl. ..................................... 156/555; 156/497; 156/499; 156/554
[58] Field of Search ............... 156/497, 499, 554, 555; 428/233, 236, 245, 246, 247, 252, 253, 259

[56] References Cited

U.S. PATENT DOCUMENTS

| 1,154,874 | 9/1915 | Meade ................... 156/499 |
| 2,706,699 | 4/1955 | Plansoln et al. ........... 156/324 |
| 2,777,779 | 1/1957 | Harwood et al. ........... 426/436 |
| 2,804,120 | 8/1957 | Dancewicz ................ 156/499 |
| 3,086,904 | 4/1963 | Uhleen ................... 156/324 |
| 3,440,133 | 4/1969 | Barnett .................. 428/253 |
| 3,546,059 | 12/1970 | Ingur et al. ............. 428/236 |
| 3,676,242 | 7/1972 | Prentice ................. 156/176 |
| 3,904,455 | 9/1975 | Goldman ................. 428/233 |
| 4,022,650 | 5/1977 | Gurgui et al. ........... 156/499 |

*Primary Examiner*—Caleb Weston
*Attorney, Agent, or Firm*—Amster, Rothstein & Engelberg

[57] ABSTRACT

A machine for bonding a layer of olefin yarn to a preference layer of nonwoven olefin material to form a laminated fabric is described. The machine includes an entry station whereat the layer of olefin yarns are oriented prior to being received on a tenter frame. The olefin yarns are conveyed to a spray station whereat one surface is coated with a solvent based adhesive and partially dried. The olefin yarns are then conveyed to a storage location for non-woven olefin material whereat it is initially bonded to the non-woven olefin material. From there it is conveyed to a bonding station where the layers are bonded together. Thereafter, the laminated fabric is automatically stacked.

6 Claims, 13 Drawing Figures

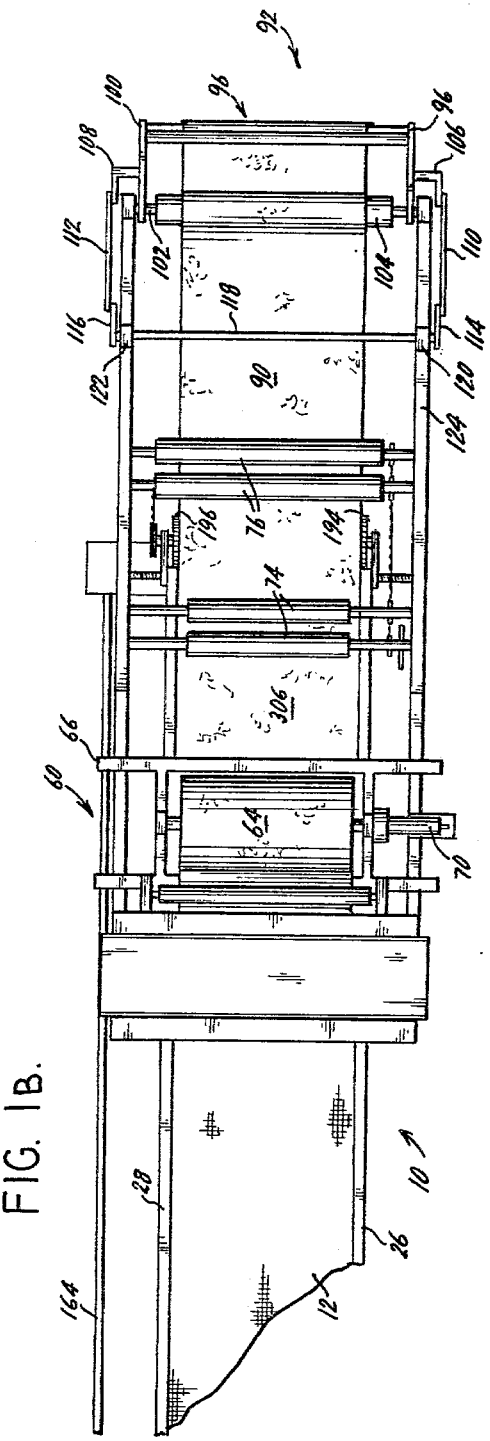
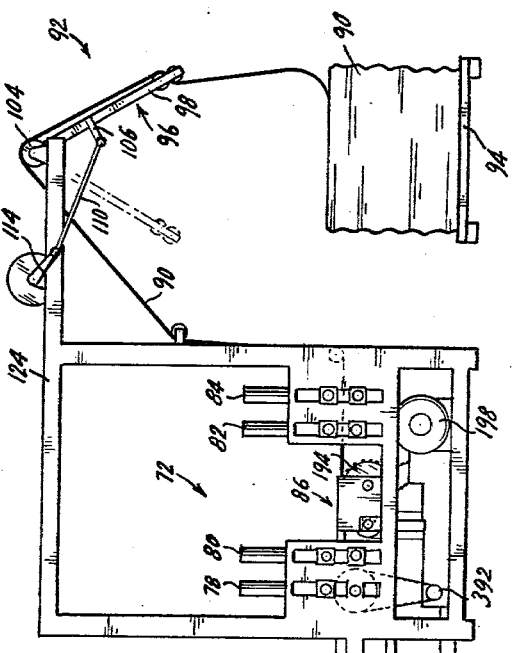
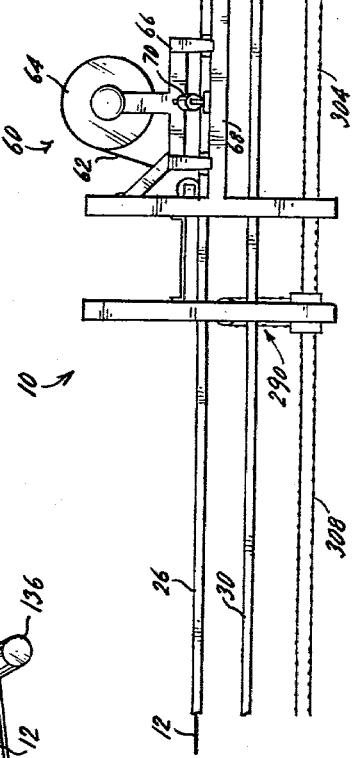
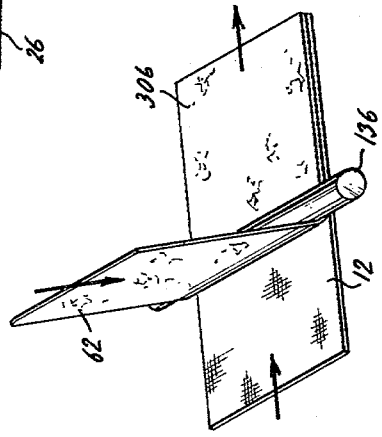
FIG. 1B.
FIG. 2B.
FIG. 3.

FIG. 5.
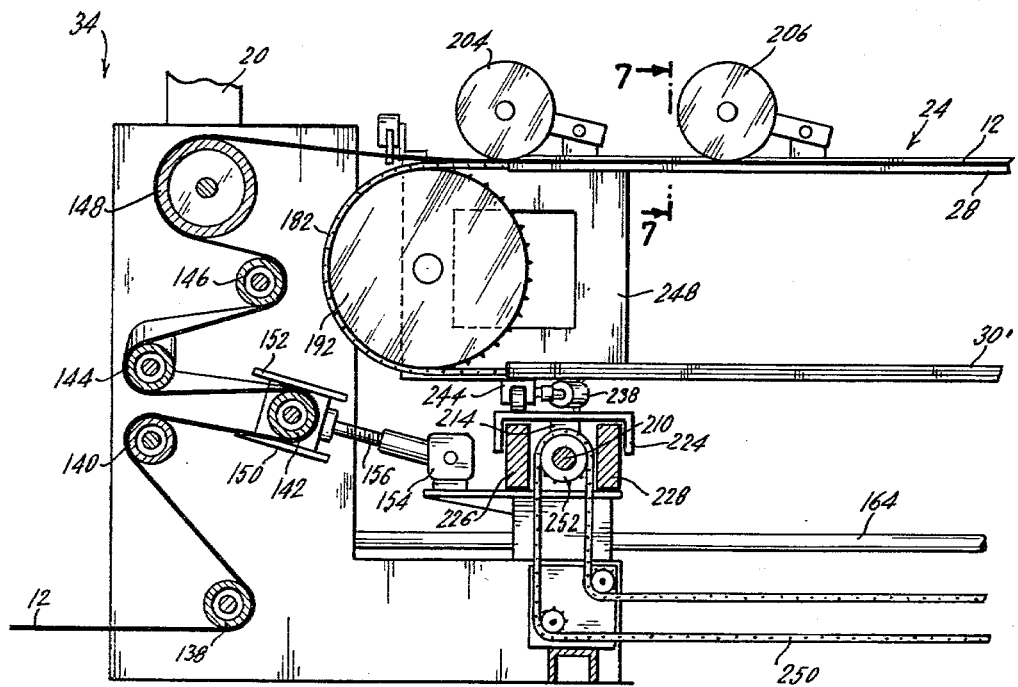
FIG. 6.
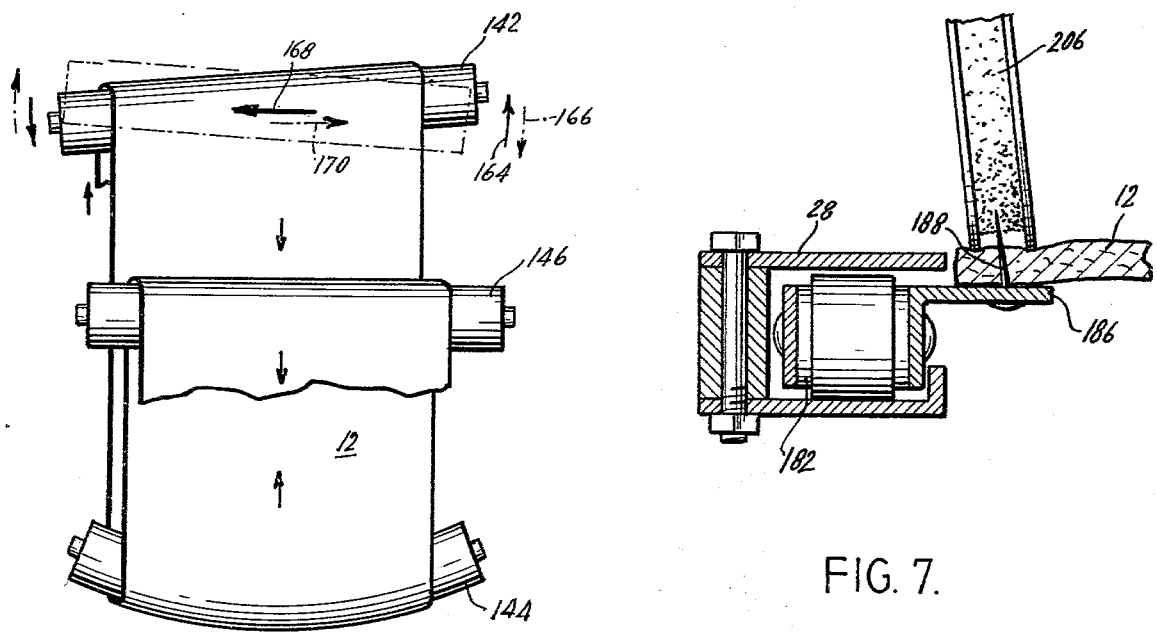
FIG. 7.

APPARATUS FOR FORMING LAMINATED FABRICS

This application is a continuation-in-part of my prior co-pending application Ser. No. 71,804, filed Dec. 21, 1978, U.S. Pat. No. 4,188,445, entitled "Laminated Fabric," which in turn is a continuation of my application Ser. No. 859,851 filed Dec. 12, 1977, abandoned, the disclosure of which is expressly incorporated by reference into the application.

DESCRIPTION OF THE INVENTION

This invention relates to lamination of fabrics and particularly to a machine for laminating a layer of woven or a knitted olefin yarn to a layer of non-woven olefin material. For simplicity of description, the layer which can be either knitted or woven olefin yarn will be referred to as woven olefin yarn.

In my co-pending application, Ser. No. 971,804 filed Dec. 21, 1978, entitled "Laminated Fabric," there is described a fabric including a top layer of woven olefin yarn bonded to base layer of non-woven olefin material to produce a unitary fabric structure. The application referred to above also generally describes a machine for producing the laminated fabric.

Experience with the machine described in the above application showed the necessity to improve the machine operation to produce the laminated fabric more economically and efficiently. It is therefore an object of the invention to provide an improved laminating machine for bonding a top layer of woven olefin yarn to a base layer of non-woven olefin material.

It is a further object of the present invention to provide an improved laminating machine which includes a lint removal system to remove lint from the top layer of woven olefin yarn prior to lamination to the non-woven olefin material.

It is a still further object of the invention to provide an improved spraying station for the laminating machine which spraying station includes a spraying booth divided into two compartments; the first compartment wherein the top layer of woven olefin yarn is sprayed with a solvent based adhesive and a second compartment in which the solvent based adhesive is partially dried.

It is another object of the invention to provide the laminating machine with a system for automatically adjusting the position of the layer of non-woven olefin material for proper alignment with the layer of woven olefin yarn prior to bonding the layers together.

It is still a further object of the invention to provide a laminating machine in which the entire width of the top and base layers are bonded.

A still further object of the invention is to eliminate any bow in the woven olefin yarns by adjusting the speed of the pressure rollers relative to the speed of the tenter frame.

In one preferred embodiment of the invention, the laminating machine includes an entry station whereat woven olefin yarn is initially stored and conveyed through a lint removal system which includes a blower to remove lint from the woven olefin yarn. From the entry station the layer of woven olefin yarn is conveyed to a tenter frame. The entry end of the tenter frame includes a series of rollers which positions the layer of woven olefin yarn prior to it being received on the tenter frame. The tenter frame includes a pair of spaced channels extending longitudinally along the length of the laminating machine through which are conveyed individual chain linkage mechanisms which carry a plurality of spaced plates extending inwardly between the tenter frame channels. Upwardly extending pins are mounted to the plates to engage the woven olefin yarn and carry it during its traverse of the laminating machine. The speed at which each chain linkage mechanism travels in its channel is adjustable to eliminate skew in the woven olefin yarns. In addition, the speed of the driven roller at the entry end of the tenter frame is variable to compensate for stretch and shrink factors in the woven olefin yarns. The distance between the opposed channels of the tenter frame are adjustable and is initially set to the width of the woven olefin yarn. It is a feature of the laminating machine of the present invention that the distance between the opposed channels of the tenter frame can be selectively adjusted over the entire length of the laminating machine from a single adjustment station. The inlet end of the tenter frame also has a fine width adjustment which permits the position of each opposed channel to be individually and automatically adjusted in response to the position of the edges of the woven olefin yarns to insure that the woven olefin yarns are properly positioned on the tenter frame.

Positioned a selected longitudinal distance downstream from the inlet end of the tenter frame is a spraying station which includes a dual compartment spraying booth. As the layer of woven olefin yarn is conveyed through the first compartment of the spraying booth, solvent based adhesive is sprayed across the entire width of one side of the woven olefin yarn. After being sprayed with solvent based adhesive, the woven olefin yarn passes into the second compartment wherein the solvent based adhesive is partially air-dried.

From the spraying station, the woven olefin yarn is conveyed downstream to a storage location for the layer of non-woven olefin material. At this storage location the non-woven olefin material is stored on a moveable sled. The non-woven olefin material is conveyed to the tenter frame by a set of idler rollers which includes a slat expander roller, having variably spaced lateral slats for smoothing the non-woven olefin material, and a downstream idler roller for pressing the layer of non-woven olefin material into contact with the adhesive on the layer of woven olefin yarn. Sensors positioned adjacent to the edge of the path of travel of the non-woven olefin material sense the position of the opposite edges of the non-woven olefin material in advance of the tenter frame and provide in response thereto sensing signals to a hydraulic cylinder which controls the lateral position of the sled holding the non-woven material. In this manner, the position of the non-woven olefin material is adjusted to insure that the non-woven olefin material is properly aligned with the woven olefin yarns when the two layers are brought into contact.

The layers of woven olefin yarn and non-woven olefin material proceed downstream to a bonding station which includes two sets of adjustable pressure rollers. The first set of pressure rollers are positioned upstream of the exit end of the tenter frame and are narrower than the layers of woven olefin yarn and non woven olefin material. Thus, in passing between the first set of pressure rollers, the layers of woven olefin yarn and non-woven olefin material are bonded together with the exception to a strip along the opposite sides of the laminated fabric. After this initial bonding step, the laminated fabric passes the exit end of the tenter frame and thereafter between a second set of pressure rollers having a width greater than the width of the laminated fabric. Thus, the entire width of the fabric is laminated in this final bond step. In addition, any bow in the woven olefin yarns is eliminated by adjusting the speed of the pressure rollers relative to the speed of the tenter frame. From the bonding station, the laminated fabric is conveyed to an exit station whereat a driven stacker assembly automatically folds the fabric onto a skid for storage.

These and other features and objects of the invention will become apparent to those skilled in the art from consideration of the following detailed description of the presently preferred embodiment in the invention when taken in conjunction with the drawings, wherein:

FIGS. 1A and 1B are top plan views of the entire laminating machine with FIG. 1A showing the portion of the laminating machine from the inlet end to the outlet of the spraying station and FIG. 1B showing the remainder of the laminating machine from the non-woven material storage location to the exit end of the machine;

FIGS. 2A and 2B are side elevation views of the entire laminating machine corresponding to the portions of the laminating machine shown in FIGS. 1A and 1B respectively;

FIG. 3 is a diagrammatic representation of a layer of woven olefin yarn being brought into contact with the layer of non-woven olefin material at the storage location;

FIG. 5 is a sectional view taken along the lines 5—5 of FIG. 1 and looking in the direction of the arrows showing a side elevation view of the entry end of the tenter frame showing the positioning rollers and the channel width adjustment for the tenter frame;

FIG. 6 is a diagramatic representation of the positioning rollers for conveying the woven olefin yarn to the tenter frame and is useful in explanation of the function of the positioning rollers;

FIG. 7 is a sectional view taken along line 7.7 of FIG. 5 and looking in the direction of the arrow showing one of the channels of the tenter frame including the chain linkage mechanism supporting an inwardly extending plate having a pin upwardly extending and being pressed through the layer of woven olefin yarn to hold the layer of woven olefin yarn to the tenter frame;

Figure 10:
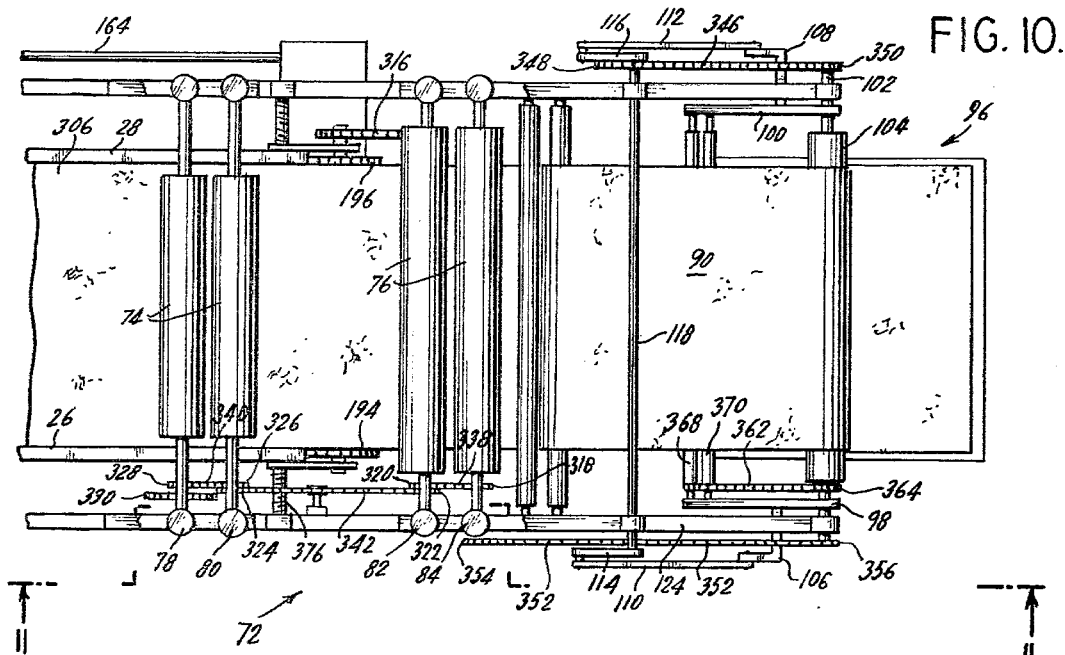
Figure 11:
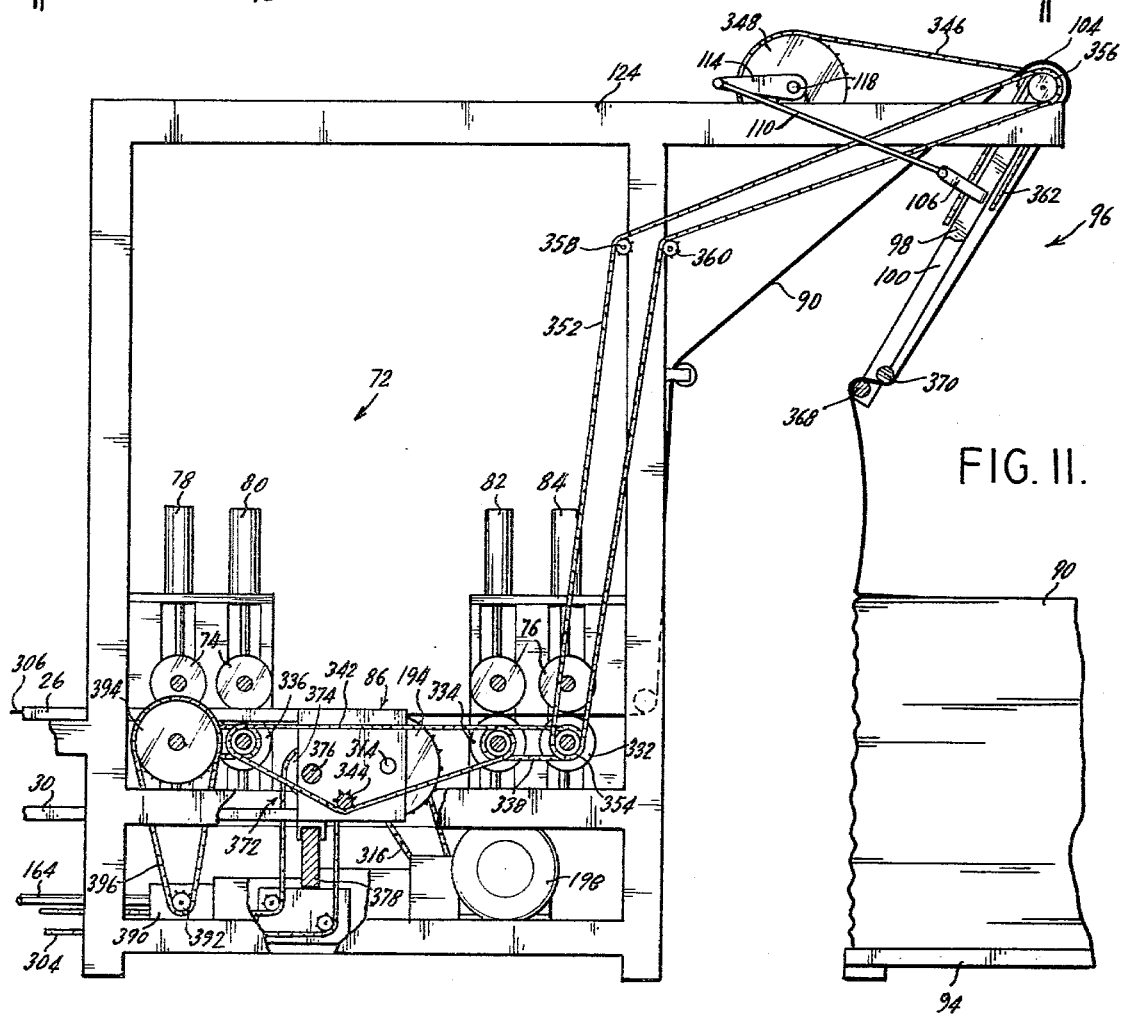

FIG. 10 is a top plan view of the exit station of the laminating machine, shown enlarged, and in particular showing the two sets of rollers used in the bonding station and the driven folder for folding the finished laminated fabric onto a skid; and FIG. 11 is a cross-sectional view taken along line 11—11 of FIG. 10 and looking in the direction of the arrows and showing a side elevation of the exit end of the laminating machine.

The overall construction of the laminating machine may be understood by reference to FIGS. 1A, 1B, 2A and 2B. The laminating machine includes an entry station, generally indicated by reference numeral 10. At entry station 10, woven olefin yarn 12 which forms one of the layers of the laminated fabric is stacked on skid 14. Entry station 10 includes a lint removal blower 16 including fan 18 mounted in frame 20 which blows lint from woven olefin yarn 12 into lint collecting bag 22 as woven olefin yarn 12 is conveyed through lint removal blower 16.

Downstream of lint removal blower 16 is tenter frame 24. Tenter frame 24 includes a pair of laterally spaced apart channels 26, 28 which support an endless chain linkage mechanism for conveying the woven olefin yarn downstream along the length of the laminating machine as will be described in detail below. The tenter frame also includes a pair of laterally spaced apart return channels, one of which, channel 30, is shown, positioned below and parallel to channels 26, 28 for supporting the endless chain linkage mechanisms on its return to the entry end 32 of tenter frame 24. Positioned at the entry end 32 of tenter frame 24 is roller assembly 34 which orients the woven olefin yarn 12 prior to it being received by the chain linkage mechanisms in tenter frame 24 as will be described in detail below. Also positioned at entry end 32 of tenter frame 24 is channel width adjustment assembly, indicated by reference numeral 36, which provides for changing the distance between the tenter frame channels to accommodate woven olefin yarns of various widths and provides instantaneous and automatic changes in channel position to insure that the woven olefin yarn is properly received on the chain linkage mechanisms in the channels.

Downstream of entry end 32 of tenter frame 24 is spray station 38 which includes dual compartment spray booth 40. Transversely mounted in the first compartment 42 is a perforated pipe 44 connected to a supply of solvent based adhesive (not shown) for applying adhesive to the woven olefin yarn. Transversely mounted in second compartment 46 are seven steam pipes 48 which provide an environment in compartment 46 which evaporates the solvent in the solvent based adhesive. An exhaust system, indicated by pipe 50 conveys the evaporated solvent away from compartment 46.

Downstream of spray station 38 is storage station 60 where the non woven material 62 is stored on roll 64 mounted on sled 66 which is moveable on frame 68 transverse to the movement of non-woven material 62 to orient non-woven material 62 for alignment with woven olefin yarn 12, as will be described in detail below. Movement of sled 66 is controlled by hydraulic cylinder 70 which is connected to sled 66. At storage station 60, the non-woven material 62 is first brought into contact with the adhesive side of the woven olefin yarn 12.

Downstream of storage station 60 is bonding station 72 which includes first and second sets of bonding rollers 74, 76 respectively, each set including two pairs of pressure rollers. The pressure between each pair of pressure rollers is adjustable by air cylinders 78, 80, 82 and 84 respectively. The first set of bonding rollers 74 is upstream of exit end 86 of tender frame 24 and are narrower than the woven olefin yarn 12 and non-woven olefin material 62 so as not to interfere with the chain linkage mechanism in channels 26,28 of tenter frame 24. The second set of bonding rollers 76 are positioned downstream of the exit end 86 of tenter frame 24. The second set of rollers 76 are wider than the width of woven olefin yarn 12 and non-woven olefin material 62 so that the entire width can be laminated thereby reducing the wastage which occurred when rollers of insufficient width were not provided.

From the second set of bonding rollers 76, the now laminated fabric 90 including a layer of woven olefin yarn 12 and a layer of non-woven olefin material 62 is conveyed to exit station 92 whereat laminated fabric 90 is automatically stacked on skid 94 by stacker assembly 96 which includes arms 98,100 pivotably mounted on shaft 102 supporting roller 104. Fixed to arms 98,100 are arms 106,108 respectively. Pivotably connected to arms 106,108 are arms 110,112 respectively which arms are in turn pivotably mounted to arms 114,116 respectively which are fixed to opposite ends of shaft 118 which is journaled in bearings 120,122 supported on frame 124. Rotation of shaft 118 causes rotation of arms 114,116 producing reciprocating movement of arms 98,100 from the full line to the dotted line position to stack the laminated fabric 90 on skid 94.

The overall operation of the laminating machine will now be generally described by reference to FIGS. 1A, 1B, and 2A, 2B. Woven olefin yarn 12 is stacked on skid 14 at entry station 10 of the laminating machine. Woven olefin yarn 12 is conveyed through tension rollers 126,128 into lint removal blower 16 where lint is blown from the woven olefin yarns and collected in lint collecting bag 22. From lint remover blower 16 the woven olefin yarn 12 is conveyed by idler rollers 130,132,134 and through roller assembly 34 where the woven olefin yarn is oriented for being received on tenter frame 24. The woven olefin yarn is received by tenter frame 24 and the opposite sides held by chain linkage mechanism which travels in channels 26, 28, 30 and the unshown channel 32. As the chain linkage mechanism travels downstream it conveys the woven olefin yarn 12 to spraying station 38 wherein it is first sprayed with a solvent based adhesive in first booth 42 and partially dried in second booth 46. From spray station 38 the woven olefin yarn 12 is conveyed to storage station 60 whereat the nonwoven olefin material 62 is conveyed from the roller of nonwoven olefin material 64 under idler roller 136 into contact with the adhesive on the woven olefin yarn 12. The non-woven olefin material 62 and woven olefin yarns 12 and then conveyed to pass between the pairs of rollers of the first set of pressure rollers 74 in bonding station 72 whereat the two layers are brought together under pressure. Since the first set of pressure rollers do not extend across the entire width of the laminated fabric there is a band along each edge of the laminated fabric which is not bonded. The laminated fabric 90 is conveyed from the tenter frame and passes between the pairs of rollers of the second set of bonding rollers 76 whereat the entire width of the laminated fabric 90 is bonded together. The fully laminated fabric 90 is then conveyed via stacker assembly 96 to skid 94.

There will now follow a detailed description of certain aspects of the invention. Referring first to FIGS. 4,5,6 and 7, there is shown generally entry end 32 to tenter frame 24 enlarged to show details of the construction and assembly.

Roller assembly 34 includes idler rollers 138,140, skew roller 142, bow roller 144, idler roller 146 and driven roller 148. Skew roller 142 is slideably mounted between channels 150, 152 and reciprocated by motor 154 via threaded rod 156. As seen on FIG. 4, each end of skew roller 142 is driven by a separate motor 154 via separate rod 156 between individual guide channel 150,152 located at opposite ends of skew roller 142, so that the orientation of each end of skew roller 142 can be controlled. All of the rollers in roller assembly 34 are journaled via respective support rods to the frame of the laminating machine. Affixed to one end of the shaft supporting driven roller 148 is bevel gear 158 which meshes with bevel gear 160 which in turn is coupled via gear train 162 to drive shaft 164 which is driven by a motor located near the exit station 92. Rotation of drive shaft 164 produces rotation of driven roller 148 via gear train 162 and bevel gears 160,158.

Roller assembly 34 guides woven olefin yarn 12 onto tenter frame 24 so that woven olefin yarn 12 will be received on tenter frame 24 aligned with opposed channels 26, 28. The roller assembly 34 also provides for overfeeding or underfeeding the fabric to the tenter frame to insure that the fabric is flat. Referring to FIG. 6 there is a diagramatic representation showing the woven olefin yarn 12 as it passes over skew roller 142, bow roller 144 and idle roller 146. Positioning of woven olefin yarn 12 is accomplished as it passes over skew roller 142. Reciprocation of skew roller 142 by motors 154 selectively causes the ends of skew roller 142 to move in the direction of arrows 164,166. Movement of skew roller in the direction of arrow 164 causes woven olefin yard 12 to move relative to skew roller 142 in the direction of solid arrow 168. Movement of skew roller 142 in the direction of arrows 166 causes woven olefin yarn 12 to move in the direction of arrow 170. The amount of movement of woven olefin yarn 12 is controlled by motor 154 by conventional means, not shown. From skew roller 142, woven olefin yarn 12 passes over the bow roller 144 which removes the bow from the woven olefin yarn 12 prior to the woven olefin yarn 12 being conveyed to tenter frame 24. The bow roller 144 is rotated by a manually controlled electric motor, not shown, to remove bow condition from woven olefin yarns 12 as is conventionally done. The woven olefin yarn 12 then passes over idler roller 146 and is driven by driven roller 148 onto tenter frame 24. Thus, if the woven olefin yarn 12 enters skew roller 142 not properly aligned for receipt on tenter frame 24, or not properly stretched skew roller 142 and bow roller 144 align and flatten woven olefin yarn 12 so that it can be received on tenter frame 24. So shown diagramatically in FIG. 4, skew roller motors 154 can be controlled via switches 176, 178.

From the driven roller 148, woven olefin yarn 12 is conveyed to the entry end 32 to tenter frame. Disposed and supported in the channels 26, 28, 30 of tenter frame 24 is a pair of tenter chains 180, 182 having a plurality of plates 184, 186 extending inwardly from the oppositely disposed channels. Extending upwardly from plates 184, 186 are a plurality of pins 188 which receive and hold the opposite edges of woven olefin yarn 12. Oppositely disposed idler sprocket wheels, 190, 192 engage endless tenter chains 180, 182 respectively at the entry end 32 of tenter frame 24. Tenter chains 180, 182 are engaged at the exit end of the tenter frame 86 by sproket wheels 194, 196 which are driven by motor 198. (See FIGS. 1B, 2B and 11). Also disposed at entry end 32 of tenter frame 24 are pinning brushes 200, 202, 204, 206 arranged in pairs along the opposite sides of the tenter frame 24 as is known in the art. Pinning brushes 200, 202, 204 and 206 press woven olefin yarn 12 onto pins 188 to insure that the edges of woven olefin yarns are securely received and held by pins 188.

Figure 4:
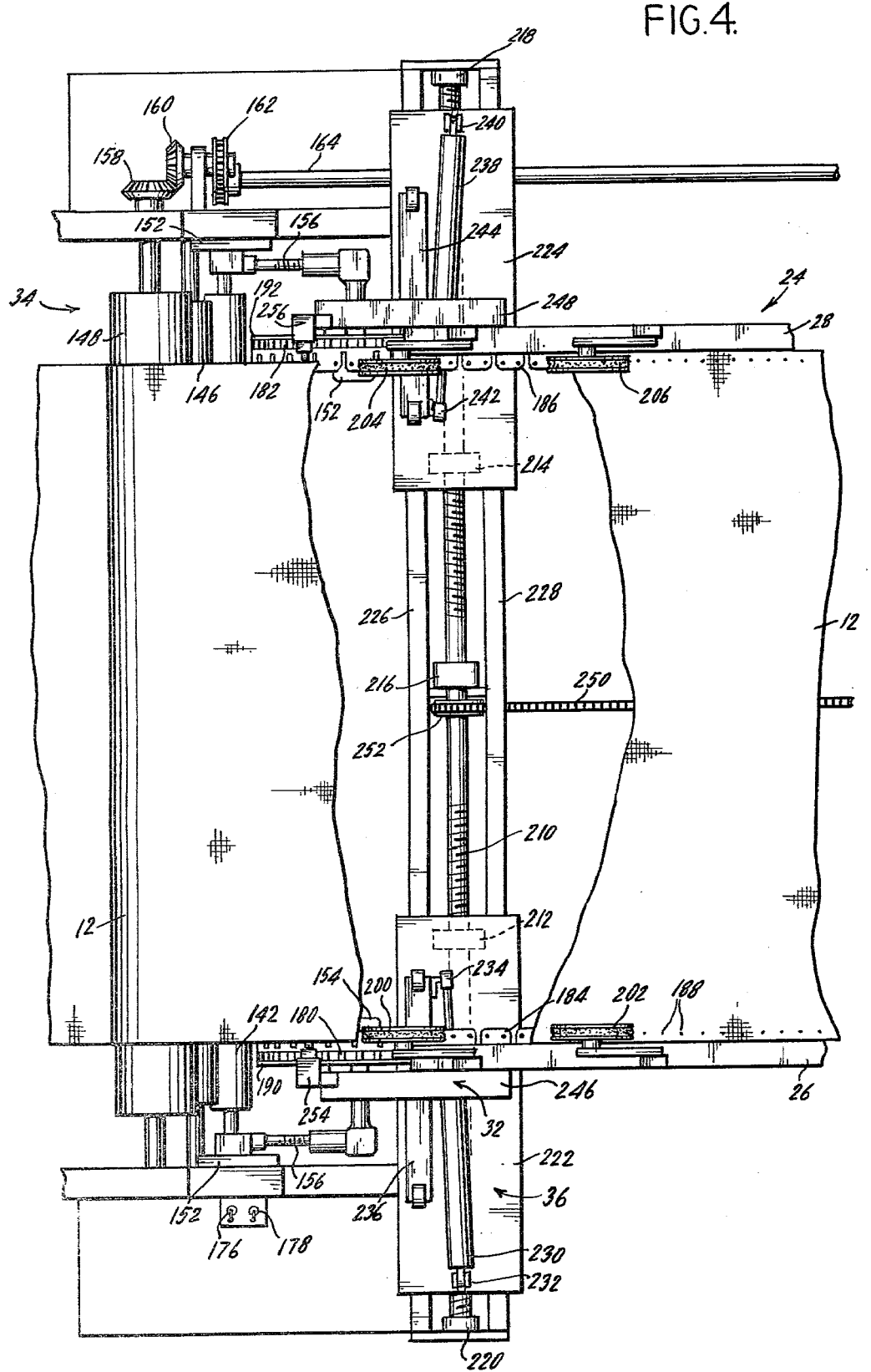
FIG. 4 is an enlarged top plan view of the entry end of the tenter frame partially cut away to show details of the chain linkage mechanism and channel width adjustment for the tenter frame.

The laminating machine is arranged to provide a single control for varying the distance between the channels of tenter frame 24. Referring first to FIG. 4, for an explanation of the channel width adjustment at entry end 32 to tenter frame 24, threaded rod 210 is supported in threaded bearing supports 212, 214 and journaled in bearing 218 and 220. Threaded bearing supports 212, 214 are fixed to supports 222, 224 respectively which are slidably mounted on rails 226, 228. Hydraulic cylinder 230 has one end 232 fixed to support 222 and the opposite end 234 connected to roller mounted sled 236 which rolls on the surface of support 222. Similarly, hydraulic cylinder 238 has one end 240 fixed to support 224 and the opposite end 242 connected to roller mounted sled 244 which rolls on the surface of support 224. Frame 246 is fixed to channels 26, 30 and to sled 236. Frame 248 is fixed to channel 28 and the channel below channel 28 (not shown) and to support 224. Thus, rotation of threaded rod 210 in threaded bearings 212, 214 will cause movement of supports 222 and 224 in opposite directions. This movement is transmitted via hydraulic cylinders 230, 238 and sleds 236, 244 to frames 246, 248 which move the channels to tenter frame 24 to adjust the distance between channels of accommodate woven olefin yarn of different nominal widths. Rotation of threaded rod 210 is effected by endless chain 250 which is received by sproket wheel 252 fixed to threaded rod 210 and which is driven by motor 198 near the exit end 86 of the tenter frame 24. As will be explained below, similar arrangements for adjusting the distance between the channels of tenter frame 24 are located at intermediate positions along the length of tenter frame 24. As will be explained, these intermediate adjustments are all controlled to provide simultaneous adjustment of the channel width along the entire length of tenter frame 24.

Provision is also made for adjusting the position of each pair of channels at the entry end 32 of tenter frame 24 in response to small changes in the location of the edges of woven olefin yarn 12. To this end sensor switches 254, 256 are fixed to channels 26, 28 and positioned along the path of travel of the opposite edges of woven olefin yarn 12. Each sensor switch 254, 256 provides a signal to control hydraulic cylinders 230, 238 respectively via conventional control circuitry which is not shown. Activation of hydraulic cylinder 230, 238 moves sleds 236, 244 respectively which roll on supports 222, 224 respectively. Sleds 236, 244 carry channels 26, 30 and channels 28 and the channel below channel 28 respectively. Thus activation of hydraulic cylinder 230 causes movement of channel 26, 30 to reposition these channels. Similarly, activation of hydraulic cylinder 238 causes movement of channels 28 and its associated unshown channel to reposition these channels. Activation of hydraulic cylinder 230 is controlled by a signal from switch 254. If switch 254 is not in contact with woven olefin yarn 12 indicating that channel 26 is too far from the center line of woven olefin yarn 12, switch 254 activate hydraulic cylinder 230 to extend piston 258 moving sled 236 inwardly carryinhg channel 26, 30 in the same direction. If switch 254 is in contact with the underside of woven olefin yarn 12, indicating that channel 26, 30 is too close the center line of woven olefin yarn 12, a signal activates hydraulic cylinder 230 to retract piston 253 moving frame 246 and channels 26, 30 outward. In a similar manner, switch 256 controls the activation of hydraulic cylinder 238 to position channels 28 and its associated channel relative to the edge of uneven olefin yarn 12.

Figure 8:
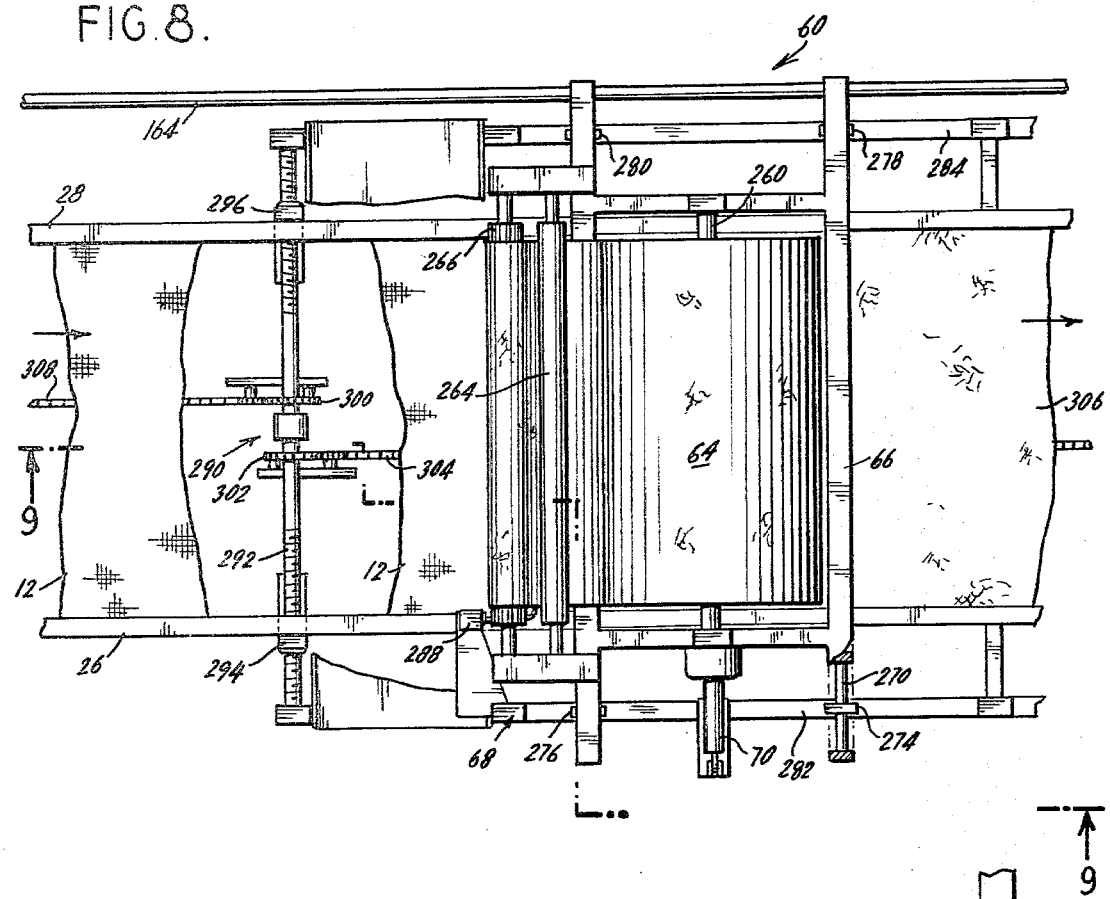
FIG. 8 is an enlarged top plan view of the nonwoven olefin material storage station partially cut away to show a second station for adjusting the width between channels of the tender frame.
Figure 9:
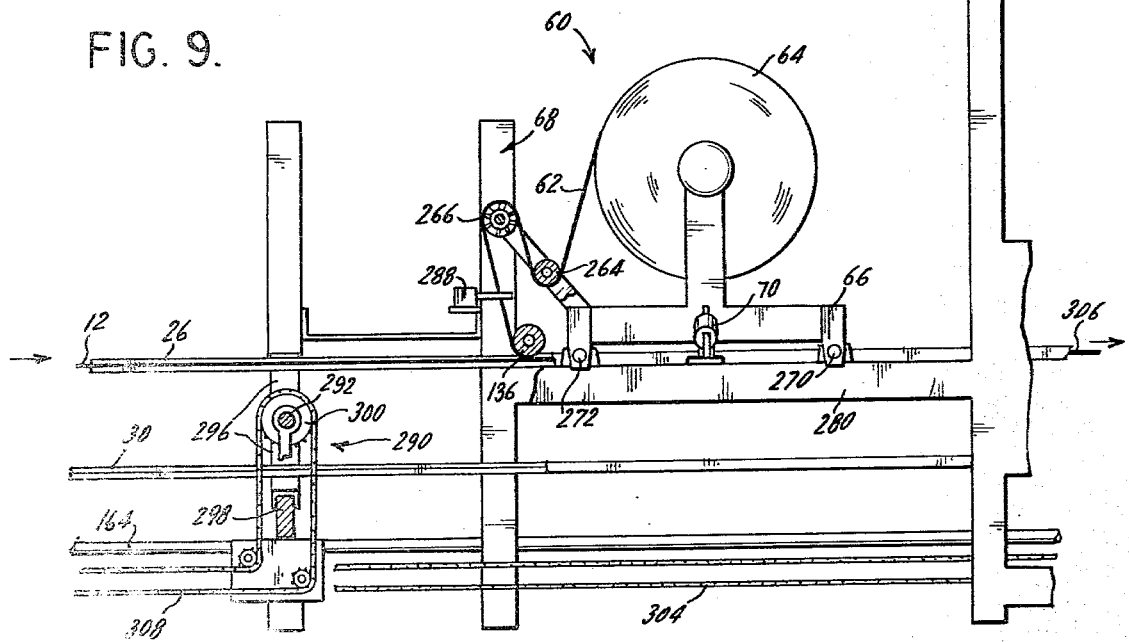
FIG. 9 is a sectional view taken along the line 9—9 of FIG. 8 and looking in the direction of the arrows showing a side elevation view of the non-woven storage location of FIG. 8 and particularly showing the manner in which the non-woven olefin material is conveyed into initial contact with the woven olefin yarn.

FIGS. 8 and 9 show storage station 60 for non-woven olefin material 62 in greater detail. At storage station 60 a roll of non-woven olefin material 64 is journaled on shaft 260 supported on sled 66 which is moveable transversely with respect to tenter frame 24 so that the position of the non-woven olefin material 62 can be adjusted to the woven olefin yarn 12 as will be described in greater detail below. Operatively disposed on sled 66 is idler roller 264, slat expander roller 266 and pressure roller 136 through which the non-woven olefin material 62 is conveyed from the roll 64 into contact with the adhesive on the woven olefin yarn 12. Slat expander roller 266 is comprised of a plurality of moveable transverse slats which stretch and smooth the nonwoven olefin material as it passes over slat expander roller 266 as is well known in the art. After passing under pressure roller 136 there is sufficient adhesion between the non-woven olefin material 62 and the woven olefin yarn 12 to cause nonwoven olefin material 62 to be conveyed from the roll 64.

To insure that the non-woven olefin material 62 is properly aligned with the woven olefin yarn 12 when the two are pressed together by pressure roller 136, the lateral position of sled 66 is adjustable. To this end, sled 66 is supported on a pair of rods, 270, 272 which are slidably mounted in slide bearings 274, 276, 278, 280 supported on longitudinally extending rails 282, 284. Movement of sled 66 is caused by hydraulic cylinder 70 which has its piston (not shown) operatively coupled to sled 66 and which is actuated from a pressure source (not shown). A sensing switch 288 is operatively disposed along the path of travel of non-woven olefin material 62 between slat expander roller 266 and pressure roller 136 to sense the edge of the non-woven olefin material 62 prior to its contacting woven olefin yarns 12. Switch 288 is operatively connected via conventional control circuitry, not shown, to provide a signal to activate hydraulic cylinder 70. Switch 288 is normally inoperative. However, if non-woven olefin material 62 is not properly aligned, the edge of the layer of non-woven olefin material 62 contacts switch 288 which operates an provides a signal to activate cylinder 70. Hydraulic cylinder 70 causes support rods 270, 272 to move transversely in bearings 274, 276, 278, 280 carrying sled 66 thereby adjusting the position of non-woven olefin material 62 relative to the woven olefin yarn 12. When proper adjustment has been achieved, the edge of the non-woven olefin material 62 no longer contacts switch 288 and the hydraulic cylinder 70 is deactivated.

Also shown in FIGS. 8 and 9 is one of the intermediate adjustment stations 290 for adjusting the distance between the channels of tenter frame 24. As shown, adjustment station 290 includes threaded rod 292 which is journaled in threaded bearings 294, 296 which are fixed to parallel channels 26, 30 and 28 and the unshown channel below channel 28 respectively. Bearings 294, 296 are slidably mounted on transverse rail 298 secured to the frame of the laminating machine.

Figure 1A:
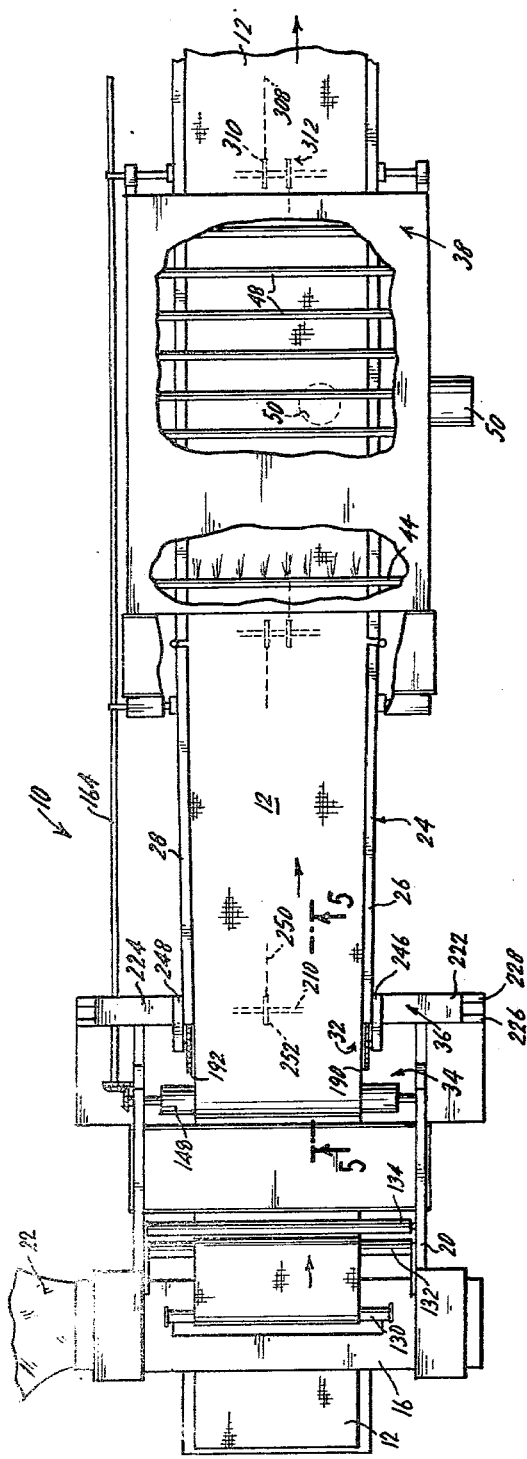
Figure 2A:
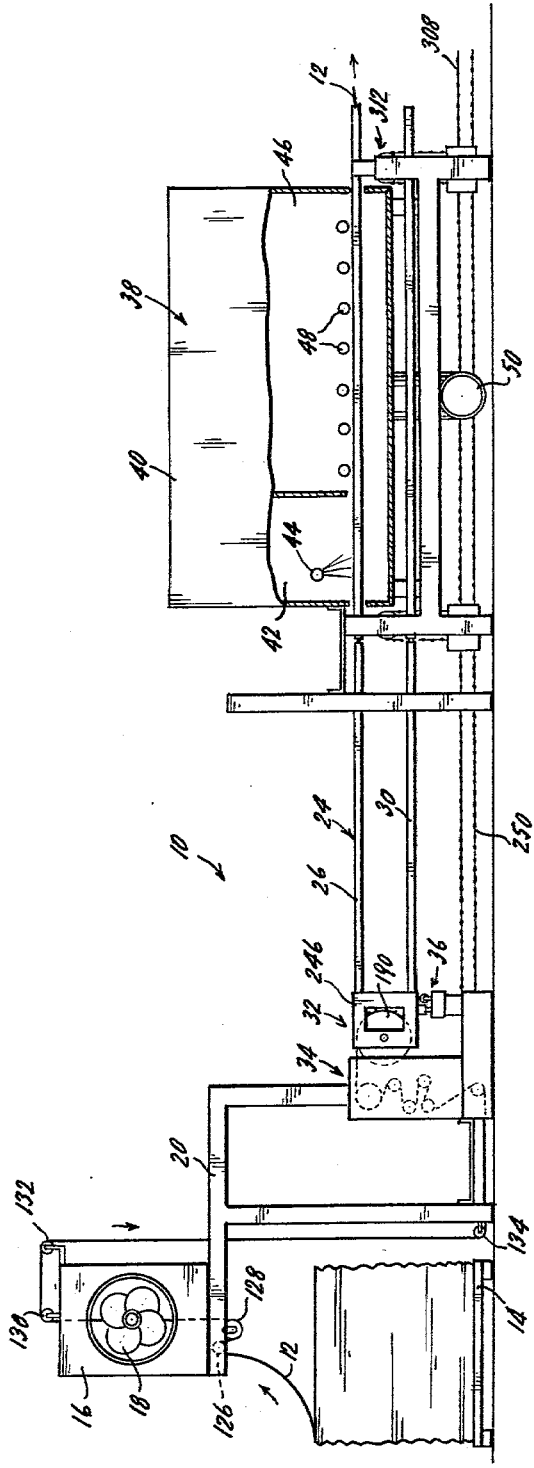

Sprocket wheel 300 is fixed to rod 292 and receives one end of endless chain 308 the other end of which passes over sprocket wheel 310 at the adjustment station 312 near the entry end of spray station 38 (FIGS. 1A, 1B). A second sprocket wheel 302 is also fixed to rod 292 and receives one end of endless chain 304, the other end of which is driven by a drive mechanism located near the exit end 86 of tenter frame 24 as will be described below. As is apparent, by driving chain 304, sprocket wheel 302 is caused to rotate, rotating rod 292. Rotation of rod 292 causes simultaneous movement of bearings 294, 296 which carry the opposed channels respectively of tenter frame 24 thereby adjusting the width of tenter frame 24. In addition, rotation of rod 292 causes rotation of sprocket wheel 300 which drives endless chain 308 to simultaneously adjust the width of tenter frame 24 at adjustment station 312 and at the entry end 32 of tenter frame 24.

The partially laminated fabric 306 consisting of a layer of woven olefin yarn 12 and a layer of non-woven olefin material 62 is conveyed from the storage location 60 to bonding station 72 shown in detail in FIGS. 10 and 11.

Referring now to FIGS. 10 and 11, the bonding station 72 includes two sets of two pairs of pressure rollers 74, 76 respectively bonding the woven olefin yarn 12 to the non-woven olefin material 62 in a two-step operation. Pressure rollers 74, which provide the first step of the bonding operation have a width which is less than the width of the partially laminated fabric 306 to provide space on the opposite ends of the roller so that the pins carrying the material on the tenter frame do not interfere with the pressure rollers 74. After the laminated fabric 306 passes the second pair of pressure rollers in first set of rollers 74 they pass the exit end 86 of tenter frame 24. At the exit end 86 are two sprocket wheels 194, 196 around which are conveyed tenter chains 180, 182. Sprocket wheels 194, 196 are fixed to shaft 314 which is journaled and driven by chain 316 which in turn is driven by motor 198. Partially laminated fabric 306 is next conveyed to the second set of pressure rollers 76 which have a width greater than the width of laminated fabric 306 and therefore bond woven olefin yarn 12 and non-woven olefin material 62 across their entire width to produce laminated fabric 90. Pressure between the complimentary pairs of rollers is selectively adjustable by air cylinders 70, 80, 82 and 84 which are operable in a conventional manner.

Each of the bottom rollers of roller sets 74, 76 are driven to move partially laminated fabric 306 and fully laminating fabric 90 through bonding rotation 72. To this end, sprocket wheels 318, 320, 322, 324, 326, 328 and 330 are affixed to shafts supporting lower rollers 332, 334, 336 and a fourth roller now shown. Endless chain 338 is connected between sprocket wheels 318 and 320. Endless chain 340 is connected between sprocket sheels 326 and 328. Endless chain 342 is connected between sprocket wheels 322 and 324 and intermediate sprocket wheel 344. Variable speed gear reducer 390 has sprocket wheel 392 coupled to sprocket wheel 394 via endless chain 396. Sprocket wheel 394 is fixed to the shaft supporting the fourth pressure roller, not shown. Another endless chain, not shown is coupled between a sprocket wheel which rotates with shaft 314 and a sprocket wheel which rotates with sprocket wheel 392. As will be apparent, motor 198 drives endless chain 316 which in turn causes shaft 314 to rotate thereby moving the unshown endless chain coupled between shaft 314 and the sprocket wheel which rotates with sprocket wheel 392. Rotation of sprocket wheel 392 moves endless chain 396 causing sprocket wheel 394 to rotate thereby driving all of the lower pressure rollers.

During travel down the tenter frame 24, woven olefin yarns 12 may become bowed. It is a feature of this invention to provide a way for correcting a bowed condition simultaneously with the lamination of woven olefin yarns 12 to non-woven olefin material 62. To this end, the speed of sprocket wheel 392 is controlled to adjust the speed of the lower pressure rollers relative to the speed of the tenter frame 24. By controlling the speed of the roller relative to the tenter frame, the speed of the center of the woven olefin yarn 12 relative to the speed of the edges of woven olefin yarn 12 is controlled to remove any bow which exists in the woven olefin yarns.

From the second set of pressure rollers the laminated fabric 90 is conveyed to stacker assembly 96 which operates to form a stack of laminated fabric 90 on skid 94. The overall operation of stacker 96 has been described above. FIGS. 10 and 11 provide additional details of the construction and operation of the stacker assembly 96. Thus, endless chain 346 is connected between sprocket wheel 348 fixed to one end of shaft 118 and sprocket wheel 350 fixed to shaft 102. Endless chain 352 is connected between sprocket wheel 354 fixed to the shaft supporting pressure roller 332 and sprocket wheel 356 is fixed to shaft 102 via intermediate sprocket wheels 358, 360. Endless chain 362 is coupled between sprocket wheel 364 fixed to shaft 102 and sprocket wheel 366 fixed to one end of the shaft supporting roller 368 journaled between arms 98, 100. As is now apparent, rotation of roller 332, caused by endless chains 342 and 338 moves endless chain 352 causing rotation of roller 104 and shaft 102 and roller 368 via endless chain 362 to pull laminated fabric 90 over roller 104 and between rollers 368 and 370. Rotation of shaft 102 also causes rotation of sprocket wheel 348 via endless chain 346 causing arms 98, 100 to oscillate thereby stacking laminated fabric 90 on skid 94.

A final adjustment station 372 is provided proximate the exit end 86 of tenter frame 24. This adjustment station 372 is similar to the adjustment station proximate entry end 32 of tenter frame 24. Thus, endless chain 304 is received by sprocket wheel 374 mounted on threaded rod 376 journaled in threaded bearings, not shown, which are fixed to the opposite channels of tenter frame 24 and which slid on support 378. Threaded rod 376 is driven by a motor not shown using conventional methods to cause movement of the channels of the tenter frame 24 and endless chain 304. Movement of endless chain 304 in turn causes adjustment of the width of the tenter frame at the other adjustment stations as has been described.

While the preferred form of the invention has been described in detail it will be readily apparent to those skilled in the art that various changes and modifications can be made without departing from the spirit and scope of the invention as set forth in the appended claims.

What I claim is:

1. Apparatus for forming a laminated fabric by laminating a layer of woven olefin yarn to a layer of nonwoven olefin material comprising: a Support, a tenter frame mounted to said support having an entry end adapted for receiving woven olefin yarn and an exit end from which the laminated fabric is conveyed; a spray section located downstream of the entry end of said tenter frame, said spray station including a spray booth having first and second compartments, said first compartment including means adopted to spray a solvent based adhesive on one surface of the woven olefin yarn and said second compartment including means for at least partially evaporating the solvent from the adhesive; a non-woven material storage positioned downstream of the spray station including a skid adapted to hold a roll of non-woven olefin material mounted for adjustable movement transverse to the tenter frame to permit non-woven olefin material to be conveyed from the storage location to the tenter frame in alignment with the woven olefin yarn on the tenter frame, and; a bonding station having two sets of pressure rollers, the first set of pressure rollers positioned upstream of the exit end of the tenter frame and the second set of pressure rollers positioned downstream of the exit end of the tenter frame and being wider than the layer of woven olefin yarn and the layer of non-woven olefin material whereby the layer of woven olefin yarn and the layer of nonwoven olefin material can be bonded across their entire width.

2. The apparatus of claim 1 further including variable speed means for driving pressure rollers in the bonding station to control the roller speed relative to the tenter frame speed to remove bow from the layer of woven olefin yarn.

3. The apparatus of claim 1 further including a width adjustment means for controlling the width of the tenter frame by using a single control.

4. The apparatus of claim 2 further including a lint removal system positioned upstream of the entry end of the tenter frame for removing lint from the woven olefin yarn prior to the entry of the woven olefin yarn onto the tenter frame.

5. The apparatus of claim 4 further including folding means positioned downstream of the exit end of the tenter frame for receiving the bonded layers of woven olefin material and non-woven olefin yarn and automatically folding the bonded fabric in preparation for shipment.

6. Apparatus for forming a laminated fabric by laminating a layer of woven olefin yarn to a layer of nonwoven olefin material comprising: a Support, a tenter frame mounted to said support having an entry adapted for receiving woven olefin yarn and an exit end from which the laminated fabric is conveyed, means for applying a solvent based adhesive on one surface of the woven olefin yarn located downstream of the entry end of said tenter frame; a non-woven material storage positioned downstream of the adhesive applying means including a skid adapted to hold a roll of non-woven olefin material mounted for adjustable movement transverse to the tenter frame to permit nonwoven olefin material to be conveyed from the storage location to the tenter frame in alignment with the woven olefin yarn on the tenter frame, and; a Bonding station having at least one set of pressure roller positioned downstream of the storage station; said pressure rollers being wider than the layer of woven olefin yarn and the layer of non-woven olefin material whereby the layer of woven olefin yarn and the layer of non-woven olefin material can be bonded across their entire width.

* * * * *